United States Patent [19]

Kunkle et al.

[11] 4,395,970
[45] Aug. 2, 1983

[54] OPEN CLEAN HABITAT FOR SHELL FISH

[76] Inventors: Arthur N. Kunkle, 86 Alice Ave., Campbell, Calif. 95008; John D. Monroe, P.O. Box 1049, Carmel Valley, Calif. 93924; Nathanael Shafer, 27660 Selfridge La., Carmel, Calif. 93923

[21] Appl. No.: 237,985

[22] Filed: Feb. 25, 1981

[51] Int. Cl.³ ............................................. A01K 61/00
[52] U.S. Cl. ..................................................... 119/4
[58] Field of Search .................................. 119/2, 3, 4

[56] References Cited

U.S. PATENT DOCUMENTS

| | | | |
|---|---|---|---|
| 2,989,945 | 6/1961 | Ford | 119/4 |
| 3,650,244 | 3/1972 | Fordham | 119/4 |
| 3,741,159 | 6/1973 | Halaunbrenner | 119/4 |
| 3,766,888 | 10/1973 | Weigardt, Jr. | 119/4 |
| 4,003,338 | 1/1977 | Neff et al. | 119/3 |
| 4,079,698 | 3/1978 | Neff et al. | 119/3 |
| 4,186,687 | 2/1980 | Gilpatric | 119/4 |
| 4,257,350 | 3/1981 | Streichenberger | 119/3 |

*Primary Examiner*—Robert P. Swiatek
*Attorney, Agent, or Firm*—Robert W. Dilts

[57] ABSTRACT

A submersible positive buoyancy habitat structure for use in rearing shell fish and the like in an open ocean environment. The habitat structure is designed to take advantage of the mass movement of water due to wave action in a vertical plane to provide continuous flushing of the habitat. To this end, the habitat structure is based on a generally tubular body having impervious side walls open at both ends with one end tethered to the ocean bottom. The open ends of the habitat are covered by a grill to keep predators out and a screen to keep adolescent shell fish within the structure. A venturi device is provided at the lower end of the structure to enhance downward vertical flow of water therethrough. Variable buoyancy flotation devices are described and an arrangement providing a plurality of habitat structures sharing a common flotation device is disclosed. A feeding device for use with the habitat structure is provided.

20 Claims, 9 Drawing Figures

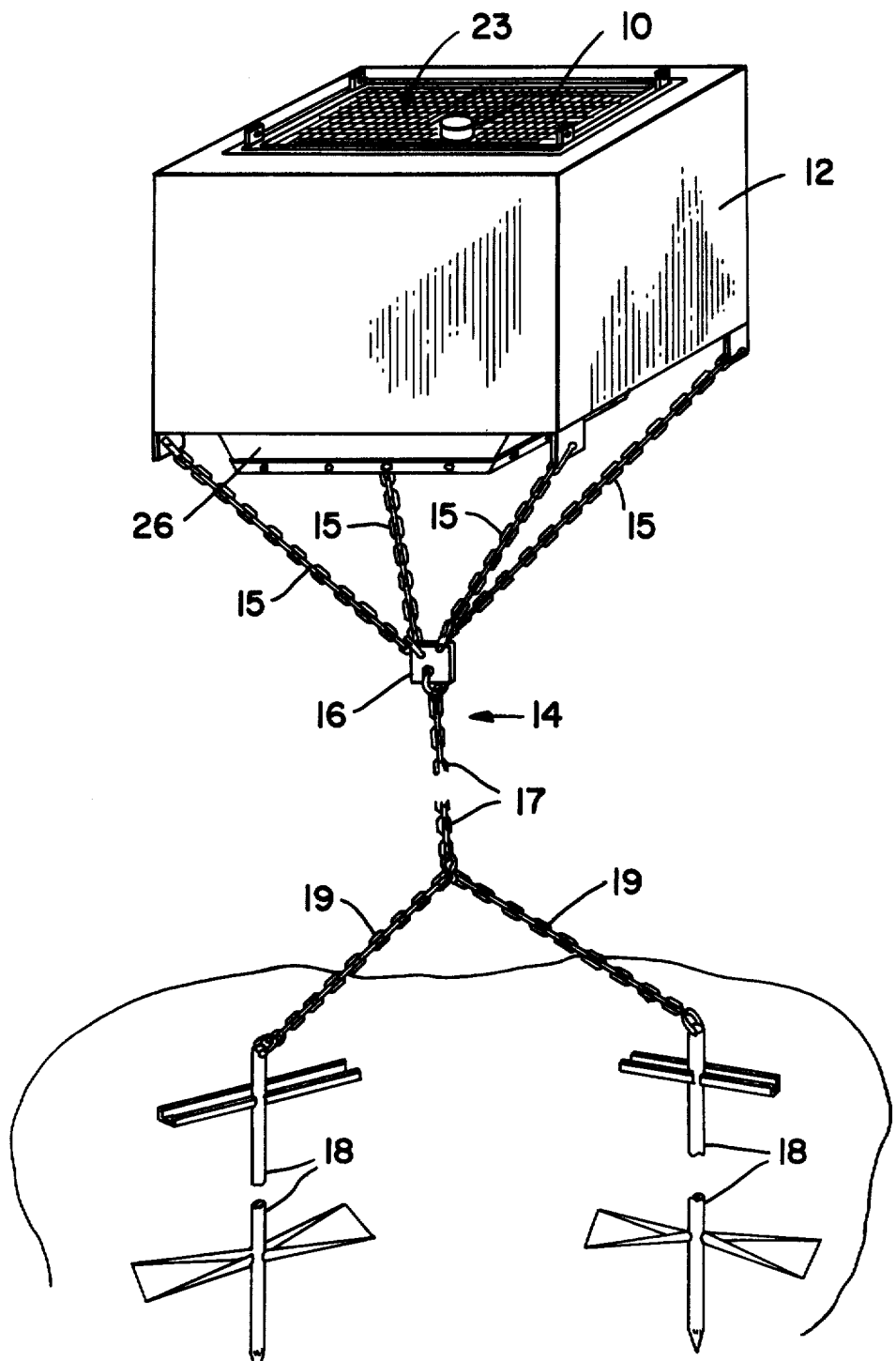
FIG_1

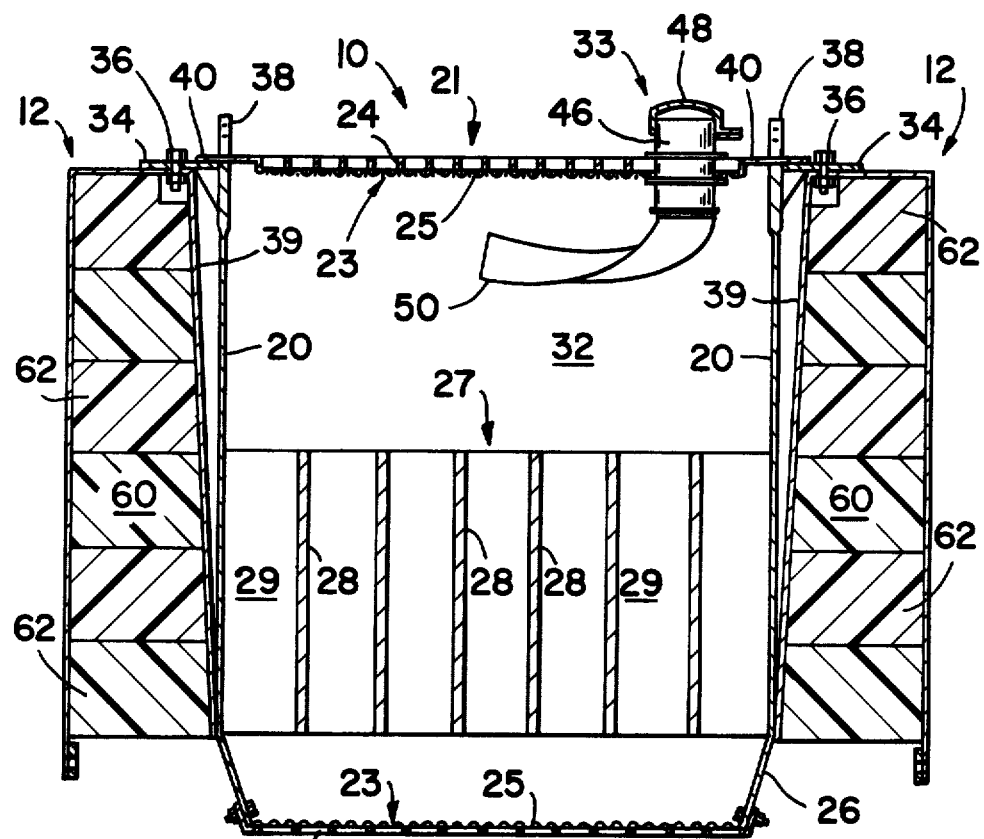
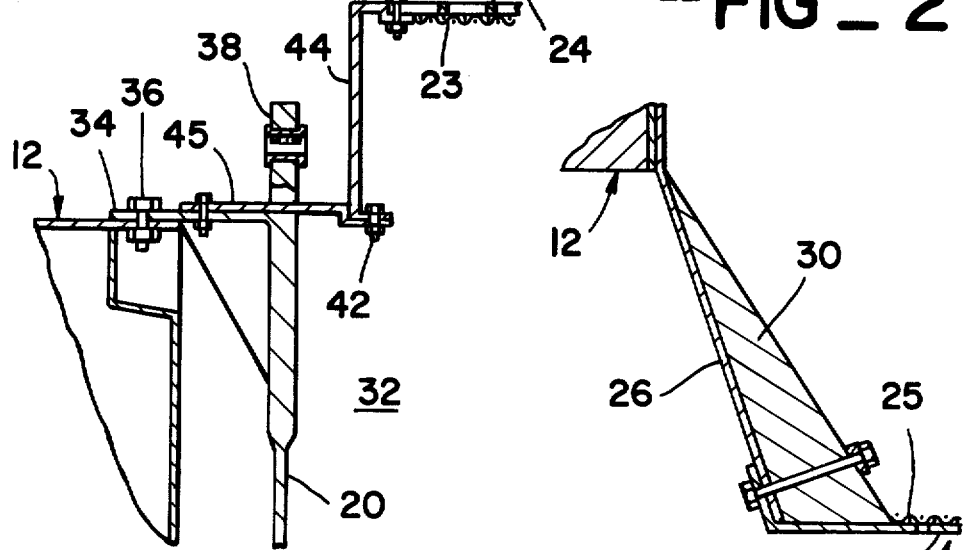

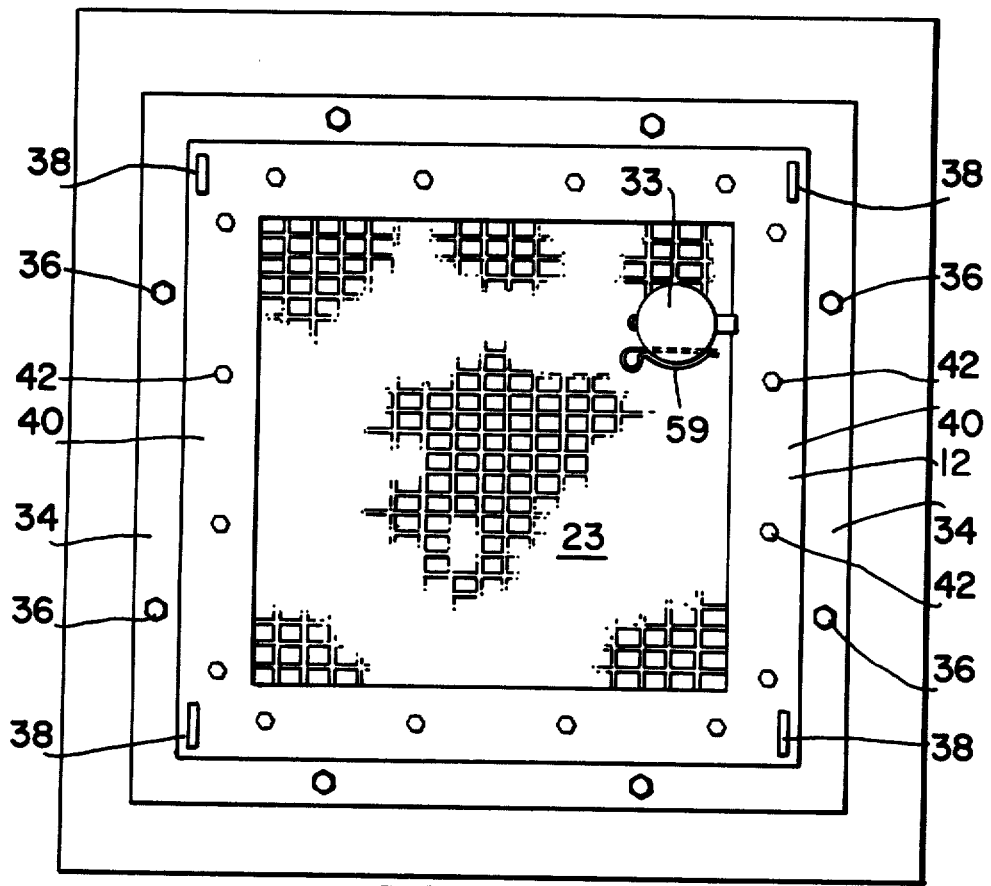
FIG_5
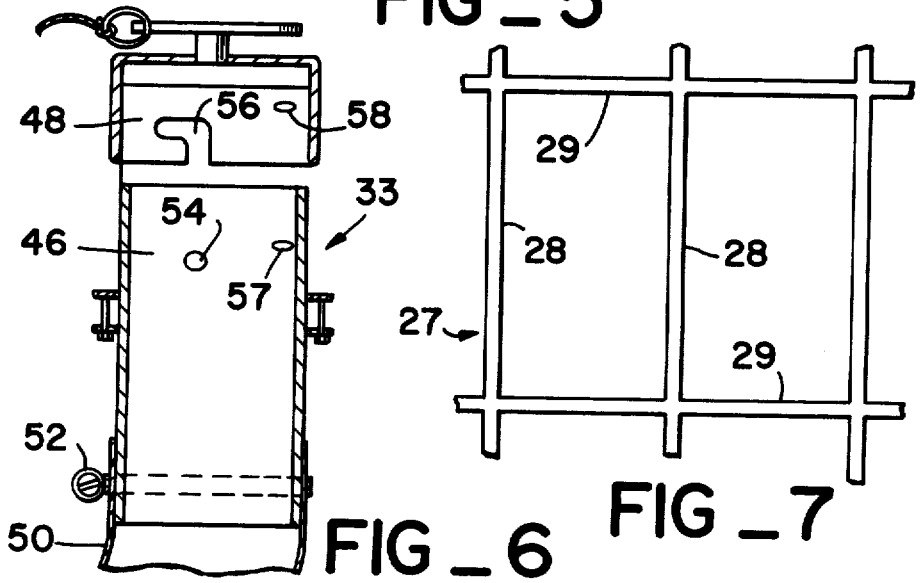
FIG_6  FIG_7

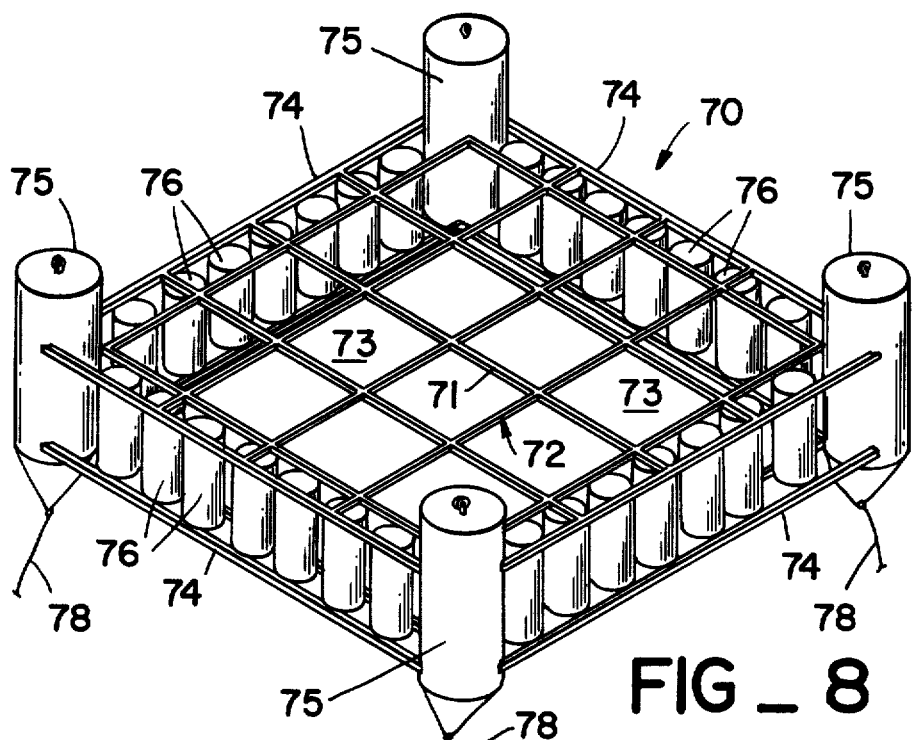
FIG_8
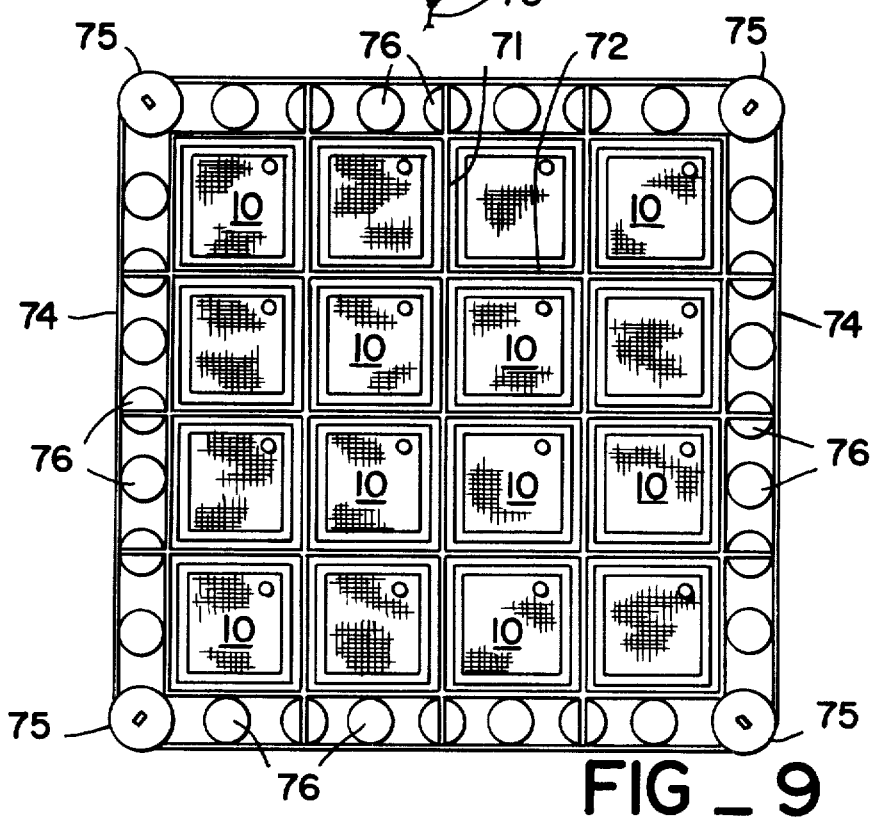
FIG_9

OPEN CLEAN HABITAT FOR SHELL FISH

DESCRIPTION

FIELD OF THE INVENTION

This invention relates to habitats for use in rearing shell fish, such as abalone and the like, and more particularly to an improved submersible, positive buoyancy habitat for use in rearing shell fish and the like in an open sea environment.

BACKGROUND OF THE INVENTION

It is known in the prior art to raise shell fish of various kinds from a juvenile stage to maturity in habitats which are placed in the ocean. The purpose of the habitat is not only to contain the shell fish for eventual harvest at maturity but also to protect the shell fish from predators as they grow to maturity.

The habitats must be constructed in such a way that food can be conveniently introduced into the habitat for the shell fish contained therein. In addition, provisions must be made for the removal of waste products from the habitat in order to ensure the continued health of the growing shell fish. Finally, the habitat must provide relatively broad surfaces to which the shell fish can attach and on which they can move during their feeding and growth.

Some habitats of the prior art have been designed to rest on the ocean bottom and are therefore limited to use in relatively shallow offshore locations.

It has been proposed to avoid the limitation to shallow offshore locations by suspending habitats in the open ocean beneath surface floats. However, such an approach is impractical because the flotation system is exposed to the violence of storms at sea and the deleterious corrosive effects of the combination of air and water at the surface of the sea. In addition, habitats suspended from floats tend to move with the water currents resulting in a substantially stagnant condition of the water within the habitat due to the fact that there is little relative motion of the water with respect to the habitat.

U.S. Pat. No. 3,741,159, issued June 26, 1973 to Lazare Nathan Halaunbrenner discloses a submersible, positive buoyancy habitat. However, the habitat structure according to the teaching of this patent does not provide for an effective flushing action within the habitat. In addition, the structure of the habitat according to the teaching of Halaunbrenner presents substantial difficulty in connection with the feeding, hygiene and general maintenance of the shell fish to be raised therein.

It is the principal object of this invention to overcome the deficiencies of the prior art by providing an improved habitat structure, having substantially continuous self-flushing characteristics to help maintain hygienic conditions within the habitat, and which is more convenient to maintain, not only in terms of the structure itself but also in terms of placing, feeding, culling, grading and harvesting shell fish and the like in an open ocean environment with the habitat being relatively easy to manufacture and of relatively low cost.

Summary of the Invention

The improved submersible positive buoyancy habitat for shell fish and the like according to this invention includes a tubular body having water impervious walls and open ends. Screen means are removably mounted across the open ends of the tubular body and a flotation means is removably attached to the tubular body without obstruction of the open ends thereof. A tether means is attached about one of the open ends of the tubular body without obstruction thereof for tethering the body and flotation means to the ocean bottom.

BRIEF DESCRIPTION OF THE DRAWINGS

This invention will be more fully understood from a reading of the following detailed description of the invention when read in conjunction with the appended drawing of preferred embodiments thereof for use in raising abalone, wherein:

FIG. 1 is a perspective view of a habitat and flotation means according to a preferred embodiment of this invention shown as tethered to the bottom in the open ocean;

FIG. 2 is a cross-section of the habitat and flotation means of FIG. 1, with the tether means omitted;

FIG. 3 is an enlarged fragmentary view of a structural detail of the lower end of an alternate embodiment of the habitat according to this invention;

FIG. 4 is an enlarged fragmentary view of a structural detail of the upper end of an alternate embodiment of the habitat according to this invention;

FIG. 5 is a top plan view of the embodiment of the habitat of this invention shown in FIGS. 1 and 2;

FIG. 6 is an enlarged exploded cross-sectional view of a portion of the feeding means according to the embodiment of this invention as shown in FIGS. 1 and 2;

FIG. 7 is an enlarged top plan view illustrating an internal structural detail of the preferred embodiment of this invention as shown in FIGS. 1 and 2;

FIG. 8 is a reduced perspective view of an alternate embodiment of this invention in which a plurality of habitats share a common float means; and FIG. 9 is a top plan view of the alternate embodiment of this invention as shown in FIG. 8.

DETAILED DESCRIPTION OF PREFERRED EMBODIMENTS

Referring to FIG. 1, a perspective view is shown of a habitat 10 mounted within a flotation means 12 and tethered to the ocean bottom by a tethering means 14 according to a preferred embodiment of this invention particularly suitable for raising juvenile abalone to adult size. As will be more fully discussed hereinafter, the habitat 10 according to this embodiment of the invention comprises a hollow box which may be about eight feet square, about eight and one-half feet high and open at both ends. Similarly, the flotation means 12 is a hollow box open at both ends and dimensioned to receive the habitat therein. Thus, the flotation means 12 may have internal dimensions which are a little over eight feet by eight feet in order to accommodate the habitat 10 and external dimensions of about twelve feet by twelve feet, thereby providing thick walls about the habitat which are hollow and may be filled with air or other low density flotation materials. The flotation means 12 is preferably about eight feet high in order to provide for sufficient buoyancy to support the habitat 10 at the desired distance above the ocean floor even when the habitat 10 contains its maximum charge of abalone.

The means 14 by which the habitat 10 and flotation means 12 are tethered to the ocean bottom is preferably made of corrosion resistant metal chain, including a bridle assembly comprising four bridle chains 15 each connected at one end to a different corner of the flotation means 12 with their other ends all connected to a common collector assembly 16. A main tether chain 17 extends to a point adjacent the ocean bottom where it is attached to one or more anchors 18 by means of anchor chains 19.

According to this invention, the habitat may be located anywhere in the ocean regardless of the ocean depth. However, it is an important feature of this invention, that the habitat be located at a depth of about 30 feet from the surface of the ocean. If the habitat 10 is located at a depth less than 30 feet from the surface of the ocean, it will be exposed to excessive wave action during the course of storms which will tend to impose physical strains on the flotation means 12 and tethering means 14 in addition to the habitat 10 and the abalone contained therein. If the habitat is located at a depth greater than about 30 feet below the surface of the ocean, then complications will be introduced into the feeding of the abalone contained therein and the maintenance of the abalone and their habitat 10. This is due to the fact that a diver descending to the habitat 10 at a depth greater than about 30 feet will be subjected to pressure greater than atmospheric pressure. Thus, at depths greater than about 30 feet, limitations may be imposed on the length of time that a diver can spend at the habitat and it will be necessary for the diver to surface in slow stages after spending any substantial time at depths greater than about 30 feet in order to provide time for decompression of his circulatory system. For similar reasons, it has been found that a habitat and its flotation means should not exceed a height of about 8 feet in order to enable a diver to work on the lower end without decending to an excessive depth and yet maintain the upper end of the habitat sufficiently below the surface of the ocean to avoid excessive physical forces due to storms. The habitat must, of course, be large enough to contain sufficient abalone to justify the time required for feeding and maintenance at a particular habitat.

Referring to FIG. 2, the habitat 10 and flotation means 12 according to the embodiment of FIG. 1, is shown in cross-section with the tether means omitted. In accordance with the teaching of this invention, the habitat 10 has water-impervious side walls 20 and is open at its upper 21 and lower 22 ends. Screen means 23 are removably mounted on the side walls 20 across the upper 21 and lower 22 ends. The screen means at each end comprises a grill structure 24 with a panel 25 of netting material secured across its inner surface. The apertures of the grill structure 24 are dimensioned to be just small enough to prevent entry into the habitat of the larger abalone predators and the netting material 25 is selected to provide apertures therethrough which are just small enough to prevent the escape of the abalone contained in the habitat, as well as the entry of smaller abalone predators. It is contemplated that screen means having netting material with progressively larger apertures will be used on a given habitat as the abalone contained therein grow to larger size approaching maturity.

The side walls 20 of the habitat according to the embodiment of this invention shown in FIGS. 1 and 2, are flat panels joined at the corners to provide a square cross-sectional shape. However, other cross-sectional shapes could be used in accordance with the teaching of this invention so long as water-impervious side walls are provided. It has been found that side walls 20 made of fiberglass are best suited for use in an abalone habitat since they provide the required corrosion resistance and yet are compatible with the attachment of abalone thereto. It is anticipated that other materials such as certain plastics may be found suitable for fabricating the water-impervious side walls 20 of a habitat 10 according to the teaching of this invention.

The grill structure 24 of the screen means 23 at the open ends 21, 22 of habitat 10 may be made of fiberglass, plastic, stainless steel, or other corrosion resistant material having sufficient strength to resist predators and the physical forces which will be imposed thereon in use. The panels 25 may be made of plastic netting sold by DuPont under the Trademark "VEXAR", for example.

According to this invention, and as shown in FIGS. 1 and 2, the flotation means 12 and tethering means 14 are attached to the habitat 10 in such a way as to tend to maintain the orientation of the habitat 10 with the open end 21 vertically above the lower end 22 and without obstructing either of the open ends 21, 22. In the open ocean environment, the habitat 10 together with the flotation means 12 and tethering means 14 will be subjected to hydrodynamic forces resulting from both current flow in generally horizontal planes and vertical mass movement of water caused by wave action. The mass movement of water due to wave action will be a generally circular movement in a vertical plane and according to the teaching of this invention, it is such movement of water that is used to provide a substantially continuous flushing of the habitat 10. Such flushing is required in order to reduce the accumulation of abalone waste products or detritus, bacterial growth and excess food particles, thereby tending to maintain hygienic conditions within the habitat 10 for healthy growth of the abalone or other shell fish therein. To this end, relative motion of water downwardly through the habitat 10 is preferred and in order to enhance such downward flow, the lower end 22 of the habitat 10 is provided with inwardly tapering wall portions or venturi means 26. Such venturi means 26 will provide an increased velocity of flow in a downward direction at the open end 22 and will slightly impede upward flow at end 22 thereby favoring the downward flow. The water-impervious side walls 20 of the habitat prevent horizontal mass movement of water due to currents in the ocean from interfering with the desired vertical flushing of the habitat 10. Using oceanographic data for Monterey Bay, California, it has been estimated that the flushing rate in the embodiment of this invention shown in FIGS. 1 and 2 will exceed one complete exchange of the water in the habitat 10 every 80 minutes during 51 weeks of a given year, with the average expected flushing rate for the habitat estimated at approximately one complete exchange of the water in the habitat 10 every 40 minutes.

In computing the flushing rates given above, the presence of food, abalone and a preferred attachment structure 27 within the habitat to provide additional surface area to which the abalone may attach themselves and move during their growth was taken into account. According to this invention, such attachment means must not provide any unnecessary obstruction to vertical water flow through the habitat 10. To this end, an egg-crate structure providing circumscribing cells having a rectangular cross-section about eight inches long and four inches wide as best shown in FIG. 7, is preferred. Such attachment means 27 preferably has a height of about four feet or about one-half the height of the habitat 10. The attachment structure may be made of a plurality of parallel panels 29 of fiberglass with a plurality of spacers 28 extending therebetween. According to this invention, the panels 29 and spacers 28 should be rigidly fixed to each other in order to avoid any possibility of relative movement therebetween which might injure or kill juvenile abalone. In addition, cracks and crevices between the panels 29 and spacers 28 should be avoided since such cracks or crevices would enable the accumulation of detritus and bacterial growth. The vertical orientation of the panels 29 and spacers 28 to provide vertically extending circumscribing cells will enhance the desired vertical flushing action through the habitat 10.

As best shown in FIG. 2, the attachment means 27 may be supported against downward movement with respect to the habitat against the shoulder provided by the inwardly tapering walls or venturi means 26. The attachment means 27 may be rigidly fixed to the side walls 20 of the habitat 10 by any appropriate means such as epoxy glue, for example.

Referring to FIG. 3, it is contemplated that the venturi means 26 at the lower end of the habitat 10 may require adjustment to accommodate the mass movement of water due to wave action in a particular location. To this end, a tapered insert 30 may be attached to the inner surface of the sloping walls or venturi means 26 as best shown in FIG. 3. It will be understood that inserts 30 may be provided in a variety of sizes to provide a venturi throat of proper dimensions for the mass movement of water at a given location. In this regard it has been found that the differential velocity of water across the top 21 and bottom 22 of the habitat due to currents, as distinguished from wave action, does not significantly affect the flushing of the habitat 10.

As best shown in FIG. 2, the upper portion 32 of the internal volume of the habitat 10 is left open to accommodate a quantity of kelp which serves as the food for the abalone contained in the habitat 10. The kelp is introduced into such upper portion 32 through a feeding means 33 which will be described in greater detail hereinbelow. Such feeding means 33 passes through the screen means 23 at the upper end of the habitat 10 and is mounted thereon.

The upper end 21 of the habitat 10 is provided with an outwardly extending peripheral flange 34 which is fixed to the flotation means 12 as by means of bolts 36. As also shown in FIG. 2, the internal wall 39 of the flotation means 12 tapers from cross-sectional dimensions larger than the cross-sectional dimensions of the habitat 10 at its upper end to dimensions which snugly receive the external dimensions of the habitat 10 at the lower end thereof. Such tapering surface 39, together with the venturi means 26 at the lower end of the habitat 10, provide for ease in inserting the habitat 10 into the flotation means 12 for attachment thereto by means of the bolts 36.

It will be understood that during the growth of the abalone within the habitat 10, such habitat may be removed from the flotation means and hoisted to the surface for routine maintenance purposes including thinning and culling of the abalone or distribution of the abalone to additional habitats in order to accommodate their growth. In addition, routine maintenance of the habitat 10 itself including cleaning and replacement of the screen means 23 as necessary or desirable, is performed at the surface of the ocean. For this reason, the upper end 21 of the habitat 10 is provided with lifting eyes 38.

The screen means 23 at the upper end 21 of the habitat 10 is provided with an outwardly extending peripheral flange 40 which is attached to the flange 34 of the habitat as by means of bolts 42, for example. Thus, the screen means 23 may be easily replaced to provide a screen means with a different netting panel 25, for example. In addition, the volume of the upper portion 32 may be increased if necessary to accommodate more food for mature abalone by substituting a screen means as shown in FIG. 4, which includes a tubular water-impervious extension 44 bolted to a ring member 45 which serves in place of the flange 40 to attach the extension to the flange 34 of the habitat 10.

The feeding means 33 preferably comprises a large diameter rigid pipe of stainless steel, plastic, or other non-corrosive material which passes through the screen 23 and is mounted thereon by any suitable means. The outer end of the pipe 46 is closed by removable cap 48. A flexible tube 50 of appropriate plastic or rubber, for example, is tightly mounted to the inner end of the pipe 46. The tube 50 is formed so that the walls thereof are normally collapsed against each other with some rigidity. This is necessary in order to prevent juvenile abalone from working their way into the tube 50, where they would tend to impede the passage of kelp through the tube 50 or be crushed during the feeding operation. Thus, the tube 50 must be sufficiently flexible to allow the passage of kelp under some pressure and yet rigid enough to resist the efforts of juvenile abalone to force themselves into the interior of the tube 50.

Referring to FIG. 6, the tube 50 may be clamped to the inner end of the pipe 46 by means of a conventional hose clamp 52, for example. The outer end of the pipe 46 may be provided with an appropriate post 54 for engaging the slot 56 of a bayonet type locking cap. It is contemplated that the kelp will be forced into the pipe 46, tube 50 and upper portion 32 of the habitat 10 by means of appropriate pumping techniques, for example. Thus, the post 54 on the outer end of the pipe 46 will also provide an appropriate locking means for a bayonet type nozzle on a feeding hose, for example. In order to prevent accidental removal of the cap 48, or the possible removal of the cap 48 by a sea otter, for example, appropriate aligned holes 57 and 58 may be provided through the pipe 46 and cap 48 to receive a locking pin 59, as best shown in FIG. 5.

The habitat 10, according to the embodiment of the invention shown in FIGS. 1 and 2, was designed to accommodate approximately 25,000 pounds of abalone. Thus the abalone habitat must be constructed to support 25,000 pounds of abalone in air when the habitat is hoisted out of the water for maintenance or harvesting. It has been found that the specific gravity of abalone range from a high of about 1.41 for juveniles having a high ratio of shell mass to body mass, to a low of about 1.25 for mature individuals having a low ratio of shell mass to body mass. Thus, the habitat 10 must also withstand a loading of approximately 6,800 pounds when in place under water. The flotation means 12 must, of course, accommodate the fluctuation in net loading resulting from the growth of the abalone. It will be understood that the flotation system 12, according to this invention, must provide sufficient positive buoyancy to result in the desired flow of water through the habitat 10 due to wave action as described hereinabove under all loading conditions. Thus, according to this invention, the flotation means must be capable of providing variable buoyancy.

Referring again to FIG. 2, according to one preferred embodiment of this invention, the flotation means 12 comprises a double-walled annular member closed at the top and open at the bottom to provide an annular volume 60 which may be filled with air or other gas, liquid or material having low specific gravity. In the specific embodiment shown in FIG. 2, the annular volume is filled by a plurality of blocks 62 of plastic material having large enclosed air pockets such as styrofoam, for example, thereby providing maximum positive buoyancy. The positive buoyancy may be reduced by removing blocks 62 from the lower end of the volume 60, taking care to maintain symmetry of flotation until the desired positive buoyancy is achieved. It will be understood that the volume 60 may also be made air-tight with appropriate valving to admit or expel water as required, to achieve the desired buoyancy.

Basically, it is desirable that the positive buoyancy be as high as is possible consistent with anchoring and tethering considerations in order to maximize the flushing action due to vertical flow of water by wave action on the habitat. Water currents will, of course, tend to move the habitat in a sideways direction and the bridle chains 15 and collector means 16 should be adapted to maintain the normal vertical orientation of the habitat to the extent possible. The sideways movement of the habitat 10 due to water currents will, of course, impose limitations as to the spacing between adjacent habitats, depending on the depth of the ocean and the length of the tether chain 17 at a particular location in the ocean. It is, of course, desirable that adjacent habitats according to this invention be as close as possible since it is contemplated that regular feeding and routine under water maintenance will be performed on a weekly or monthly basis by divers. Thus, a diver will descend to the habitat to inspect the abalone, replenish the food supply, and perform routine cleaning and maintenance operations from a suitable maintenance and feeding vessel. If the habitats are widely separated, excessive time and effort will be required to move the maintenance vessel from habitat to habitat with a descent and ascent of the diver being required at each habitat whereas, if the habitats are closely spaced, then a number of habitats could be maintained for each position of the maintenance vessel and each descent of the diver.

Thus, referring to FIGS. 8 and 9, it is contemplated that a plurality of habitats 10 according to this invention, may be supported by a common flotation means 70. As best shown in FIG. 8, the common flotation means 70 may comprise a grid-like platform consisting of intersecting beams 71, 72 providing a row and column array of openings 73 each dimensioned to accommodate a habitat 10, according to this invention, for mounting therein. The beams 71 and 72 are rigidly fixed to an appropriate peripheral cradle 74 carrying a plurality of air-tight tanks 75, 76. The air tanks 75, 76 are elongated with their long axis extending in a generally vertical direction in use. As shown in FIG. 8, the air tanks 75 at the four corners of the common flotation means may be of larger volume than the volume of the air tanks 76 positioned along the sides of the common flotation means 70. Thus, the air tanks 75 may provide a certain minimum positive buoyancy for the common flotation means 70 with each of the tanks 76 along the sides thereof being provided with appropriate valving means so that water may be admitted thereto or expelled therefrom in order to adjust the positive buoyancy of the common flotation means 70 as required, depending on the number and location of the habitats supported thereby and the condition of the abalone in the various habitats 10. Use of a plurality of elongated vertically oriented tanks 76 is, of course, required in order to avoid the tipping action that would occur due to water motion within flotation tanks having substantial horizontal dimensions in proportion to vertical dimensions thereof. Thus, the common flotation means shown in FIGS. 8 and 9 would provide a stable platform capable of supporting a plurality of habitats 10 according to the teaching of this invention. It will be understood that the shape and dimensions of the common flotation means could be varied as necessary or desirable. In the embodiment shown in FIG. 8, the corner tanks 75 of the flotation means 70 are tethered to the bottom of the ocean by appropriate tether means indicated generally at 78.

Thus, a maintenance vessel may be located directly over the common flotation means 70 and in a single descent a diver could perform the necessary inspection, feeding and maintenance operations on a plurality of habitats 10. At the same time, the physical dimensions of each habitat 10 could be small enough to enable ease of handling during hoisting of the habitat 10 for major maintenance, grading, culling and harvesting of the abalone.

It is believed that those skilled in the art will make obvious modifications in the embodiments of this invention shown in the drawing and described hereinabove. For example, a variety of different anchors, including dead weights may be used, although the type of the anchors shown in FIG. 1 are preferred for economic reasons. Depending on the circumstances, it may be desirable to use line instead of chain in the tether means in certain situations, where the shock absorbing advantages of line will outweigh the increased maintenance and short life disadvantages thereof. The interior surfaces of the tubular habitat body may define a frusto conical volume thereby providing the desired venturi action at the small end thereof, but such a structure would tend to be more difficult and expensive to fabricate. Various materials may be used for the construction of the habitat so long as they are compatible with the undersea environment and with the particular shell fish to be contained in the habitat. Noncircumscribing attachment means could be used in place of the egg-crate type of attachment means for the more mature shell fish, provided appropriate maintenance is performed to avoid build up of detritus and bacterial growth. However, the egg-crate type attachment means is preferred in order to enhance the flushing action required for hygienic conditions within the habitat. Thus, the foregoing and other similar modifications may be made in the preferred embodiment disclosed herein without departing from the scope of this invention.

What is claimed is:

1. A submersible, positive buoyancy habitat for shell fish and the like comprising:
   (a) a tubular body open at both ends and having water impervious walls;
   (b) screen means removably mounted across said open ends of said tubular body;
   (c) flotation means surrounding the longitudinal axis of said tubular body and removably attached to said water impervious walls of said tubular body providing positive buoyancy for said tubular body without obstruction of said open ends thereof; and (d) tether means attached about one of said open ends of said tubular body without obstruction thereof for tethering said body and said flotation means to the ocean bottom with the other of said open ends of said tubular body above said one of said open ends of said tubular body and with said one of said open ends of said tubular body above the ocean bottom and said other of said open ends of said tubular body at a predetermined depth below the ocean surface, said flotation means being located at substantially said predetermined depth.

2. A habitat as claimed in claim 1 wherein one of said open ends of said tubular body has smaller cross-sectional dimensions than the other of said open ends of said tubular body.

3. A habitat as claimed in claim 1 wherein said tubular body is provided with venturi means adapted to accelerate water flow out of said tubular body through one of said open ends thereof.

4. A habitat as claimed in claim 3 wherein said venturi means is adapted to accelerate water flow out of said one end of said tubular body about which said tether means is attached.

5. A habitat as claimed in claim 1 wherein said flotation means provides variable positive buoyancy.

6. A habitat as claimed in claim 5 wherein said flotation means comprises a closed volume with valve means for the establishment of selected relative volumes of low density fluid and water therein.

7. A habitat as claimed in claim 1 wherein an attachment means for said shell fish and the like is rigidly mounted in a portion of said tubular body adjacent said one of said open ends of said tubular body about which said tether means is attached.

8. A habitat as claimed in claim 7 wherein said attachment means comprises an array of circumscribing tubular cells having their tubular axes substantially aligned with the tubular axis of said tubular body.

9. A habitat as claimed in claim 8 wherein said attachment means comprises a plurality of generally planar substantially parallel fiberglass panels rigidly spaced from each other by a plurality of spaced generally planar substantially parallel fiberglass spacers extending normally to said panels.

10. A habitat as claimed in claim 1 wherein said screen means at each of said open ends of said tubular body comprises a grill structure having a panel of netting material attached across the inner surface thereof.

11. A habitat as claimed in claim 1 wherein a feeding means is provided which passes through said screen means mounted across one of said open ends of said tubular body.

12. A habitat as claimed in claim 11 wherein said feeding means comprises a section of rigid pipe passing through said screen means and a section of flexible tubing fabricated with the walls thereof in normally collapsed condition having one end tightly mounted about the inner end of said rigid pipe.

13. A habitat as claimed in claim 1 wherein a plurality of tubular bodies share said flotation means in common.

14. A habitat as claimed in claim 1 wherein said flotation means comprises an annular volume containing a low density substance about said tubular body.

15. A habitat as claimed in claim 14 wherein said annular volume is open at the end thereof adjacent said one of said open ends of said tubular body about which said tether means is attached and closed to passage of said low density substance at the other end thereof.

16. A habitat as claimed in claim 15 wherein said annular volume comprises a double walled box made of fiberglass panels and said low density substance comprises blocks of plastic foam dimensioned to be received between said double wall of said box.

17. A habitat as claimed in claim 14 wherein said tether means is attached to said flotation means and wherein said tubular body is provided with lifting means about the other one of said open ends of said tubular body whereby said tubular body may be removed from said flotation means leaving said flotation means tethered in place.

18. A habitat as claimed in claim 17 wherein the inner surface of said annular volume of said flotation means tapers from cross-sectional dimensions at one end thereof which are larger than the external cross-sectional dimensions of said tubular body to cross-sectional dimensions at the other end thereof dimensioned to receive said tubular body with a snug fit and with said tether means attached to said flotation means about said other end thereof.

19. A habitat as claimed in claim 1 wherein said flotation means comprises a plurality of volumes about said tubular body each containing a low density substance.

20. A habitat as claimed in claim 1 wherein said tubular body is a hollow box made of fiberglass panels.

* * * * *